US012720024B2

(12) United States Patent
Liao et al.

(10) Patent No.: US 12,720,024 B2
(45) Date of Patent: Aug. 25, 2026

(54) PROJECTION DEVICE AND AUTO FOCUS METHOD

(71) Applicant: Coretronic Corporation, Hsin-Chu (TW)

(72) Inventors: Yi-Jun Liao, Hsin-Chu (TW); Kun-Hong Chen, Hsin-Chu (TW); Yu-Hsuan Hsieh, Hsin-Chu (TW); Yun-Shih Chen, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 399 days.

(21) Appl. No.: 18/411,043

(22) Filed: Jan. 12, 2024

(65) Prior Publication Data

US 2024/0267498 A1 Aug. 8, 2024

Related U.S. Application Data

(60) Provisional application No. 63/443,985, filed on Feb. 8, 2023.

(30) Foreign Application Priority Data

Mar. 31, 2023 (CN) ......................... 202310331884.8

(51) Int. Cl.
*H04N 9/31* (2006.01)

(52) U.S. Cl.
CPC .................................. *H04N 9/317* (2013.01)

(58) Field of Classification Search
CPC ...... H04N 9/315; H04N 9/317; H04N 9/3141; H04N 9/3152; H04N 9/3155;
(Continued)

(56) References Cited

U.S. PATENT DOCUMENTS 5,422,699 A 6/1995 Sato et al.
9,116,299 B2 8/2015 Asano
(Continued)

FOREIGN PATENT DOCUMENTS

CN 109005396 12/2018
CN 108024101 10/2020
(Continued)

OTHER PUBLICATIONS

Yi-Jun Liao et al., "Projection Device and Projection Correction Method", Unpublished U.S. Appl. No. 19/074,448, filed Mar. 10, 2025.
(Continued)

*Primary Examiner* — Sultan Chowdhury
(74) *Attorney, Agent, or Firm* — JCIPRNET

(57) ABSTRACT

A projection device, including a projection module, a projection lens, a distance sensor, a focus adjustment module, and a control unit, is provided. The projection module is configured to generate an image beam. The projection lens is disposed on a transmission path of the image beam. The focus adjustment module is connected to the projection lens. The control unit is configured to enable the projection device to enter a focus mode; enable the projection module to project the image beam to a projection surface; enable the distance sensor to sense a projection distance; calculate a focus adjustment parameter by using an auto focus transfer function according to the projection distance; and control the focus adjustment module to adjust a focal length of the projection lens according to the focus adjustment parameter. An auto focus method is also provided.

15 Claims, 9 Drawing Sheets

(58) Field of Classification Search
CPC .... H04N 9/3191; H04N 9/3194; G03B 21/00; G03B 21/28; G03B 21/142; G03B 21/145; G03B 21/147; G03B 21/208
See application file for complete search history.

(56) References Cited

U.S. PATENT DOCUMENTS

| | | | | |
|---|---|---|---|---|
| 10,146,975 | B2 | 12/2018 | Canini et al. | |
| 2007/0046902 | A1 | 3/2007 | Yajima | |
| 2009/0036158 | A1 | 2/2009 | Fujinawa et al. | |
| 2018/0091784 | A1* | 3/2018 | Dutton | H04N 9/315 |
| 2019/0163044 | A1* | 5/2019 | Chung | G03B 21/53 |
| 2020/0310230 | A1* | 10/2020 | Liu | H04N 9/315 |

FOREIGN PATENT DOCUMENTS

| | | |
|---|---|---|
| CN | 112422939 | 2/2021 |
| CN | 113301314 | 8/2021 |
| EP | 2166755 | 3/2010 |
| JP | 2009229738 | 10/2009 |
| TW | 201237542 | 9/2012 |
| TW | 201241542 | 10/2012 |
| TW | I703400 | 9/2020 |
| WO | 2018154634 | 8/2018 |

OTHER PUBLICATIONS

"Office Action of Taiwan Related Application No. 113123268", issued on May 22, 2025, pp. 1-4.
"Search Report of Europe Related Application, Application No. 25162199.1", issued on Jul. 30, 2025, p. 1-p. 9.

* cited by examiner

PROJECTION DEVICE AND AUTO FOCUS METHOD

CROSS-REFERENCE TO RELATED APPLICATION

This application claims the priority benefit of U.S. provisional application Ser. No. 63/443,985, filed on Feb. 8, 2023, and China application serial no. 202310331884.8, filed on Mar. 31, 2023. The entirety of each of the above-mentioned patent applications is hereby incorporated by reference herein and made a part of this specification.

BACKGROUND

Technical Field

The disclosure relates to an optical device and an auto focus method, and in particular relates to a projection device and an auto focus method applicable to the projection device.

Description of Related Art

Generally, when using the projection device, it is necessary to adjust the focal length of the projection lens according to different projection distances, so that the projection image has the optimal clarity. In the projection device, common auto focus adjustment techniques may be roughly divided into auto focus by ranging and auto focus by camera.

The principle of the auto focus by ranging is to detect the projection distance between the projection surface and the projection device by the distance sensor in the projection device, and adjust the focal length of the projection lens according to the detected projection distance.

The auto focus by camera is to capture the projection image by the camera, perform computations on the captured image data, and then adjust the focal length of the projection lens according to the computation results. When the camera judges that the projection image achieves the clearest focus result, the auto focus process is completed.

However, in the conventional auto focus by ranging technique, it is necessary to pre-download a lookup table of different projection distances and corresponding focus adjustment parameters. The focus adjustment parameters of the lookup table are fixed after the projection device leaves the factory and are not open for the user to adjust by himself. If the projection device of the user encounters the issue of unclear image focus, the focus can only be manually fine-tuned for a single projection distance and cannot be automatically applied to the focus adjustment parameters of all projection distances, causing the projection lens to be unable to be adjusted to the optimal focus position.

However, in the conventional auto focus by camera technique, the system must have relatively high-level computing and processing capabilities due to the need for image processing of image data. However, the use of the image processing for focus comparison requires a relatively long focus time, thus increasing the burden on system performance. In addition, since the camera needs to continuously capture the projection images, there may be issues such as slow response speed and the captured images being affected by the surrounding image light.

In addition to the above issues, due to long-term use of the projection device, the temperature of the projection lens rises after being irradiated by the light source, causing the structure of the projection lens to change, resulting in the issue of unclear projection image focus after the object distance of the projection lens changes.

The information disclosed in this Background section is only for enhancement of understanding of the background of the described technology and therefore it may contain information that does not form the prior art that is already known to a person of ordinary skill in the art. Further, the information disclosed in the Background section does not mean that one or more issues to be resolved by one or more embodiments of the invention was acknowledged by a person of ordinary skill in the art.

SUMMARY

The disclosure provides a projection device and an auto focus method applicable to the projection device, which can provide an improved auto focus effect.

Other objectives and advantages of the disclosure can be further understood from the technical features disclosed in the disclosure.

In order to achieve one, a part, or all of the above objectives or other objectives, an embodiment of the disclosure provides a projection device for projecting an image beam onto a projection surface. The projection device includes a projection module, a projection lens, a distance sensor, a focus adjustment module, and a control unit. The projection module is configured to generate the image beam. The projection lens is disposed on a transmission path of the image beam from the projection module. The focus adjustment module is connected to the projection lens. The control unit is electrically connected to the distance sensor and the focus adjustment module. The control unit is configured to enable the projection device to enter a focus mode; enable the projection module to project the image beam to the projection surface through the projection lens to generate a projection image; enable the distance sensor to sense a projection distance between the projection device and the projection surface; calculate a focus adjustment parameter by using an auto focus transfer function according to the projection distance from the distance sensor; and control the focus adjustment module to adjust a focal length of the projection lens according to the focus adjustment parameter to perform auto focus.

To achieve one, a part, or all of the above objectives or other objectives, an embodiment of the disclosure provides an auto focus method applicable to a projection device. The projection device includes a distance sensor, a focus adjustment module, and a control unit. The control unit is electrically connected to the distance sensor and the focus adjustment module. The auto focus method includes the following steps. The projection device is enabled to enter a focus mode. An image beam is generated by the projection device, and the image beam is projected to a projection surface through the projection lens to generate a projection image. The distance sensor is enabled to sense a projection distance between the projection device and the projection surface. A focus adjustment parameter is calculated by the control unit and by using an auto focus transfer function according to the projection distance from the distance sensor. The focus adjustment module is controlled by the control unit to adjust a focal length of the projection lens according to the focus adjustment parameter to perform auto focus.

Based on the above, in the projection device and the auto focus method of the embodiments of the disclosure, since the system may calculate the focus adjustment parameter by using the auto focus transfer function according to the projection distance, and then adjust the focal length of the projection lens according to the focus adjustment parameter to perform auto focus, using the projection device and the auto focus method of the embodiments of the disclosure can maintain a preferable projection effect.

Other objectives, features and advantages of the disclosure will be further understood from the further technological features disclosed by the embodiments of the disclosure wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top", "bottom", "front", "back", etc., is used with reference to the orientation of the Figure(s) being described. The components of the disclosure can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the disclosure. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing", "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
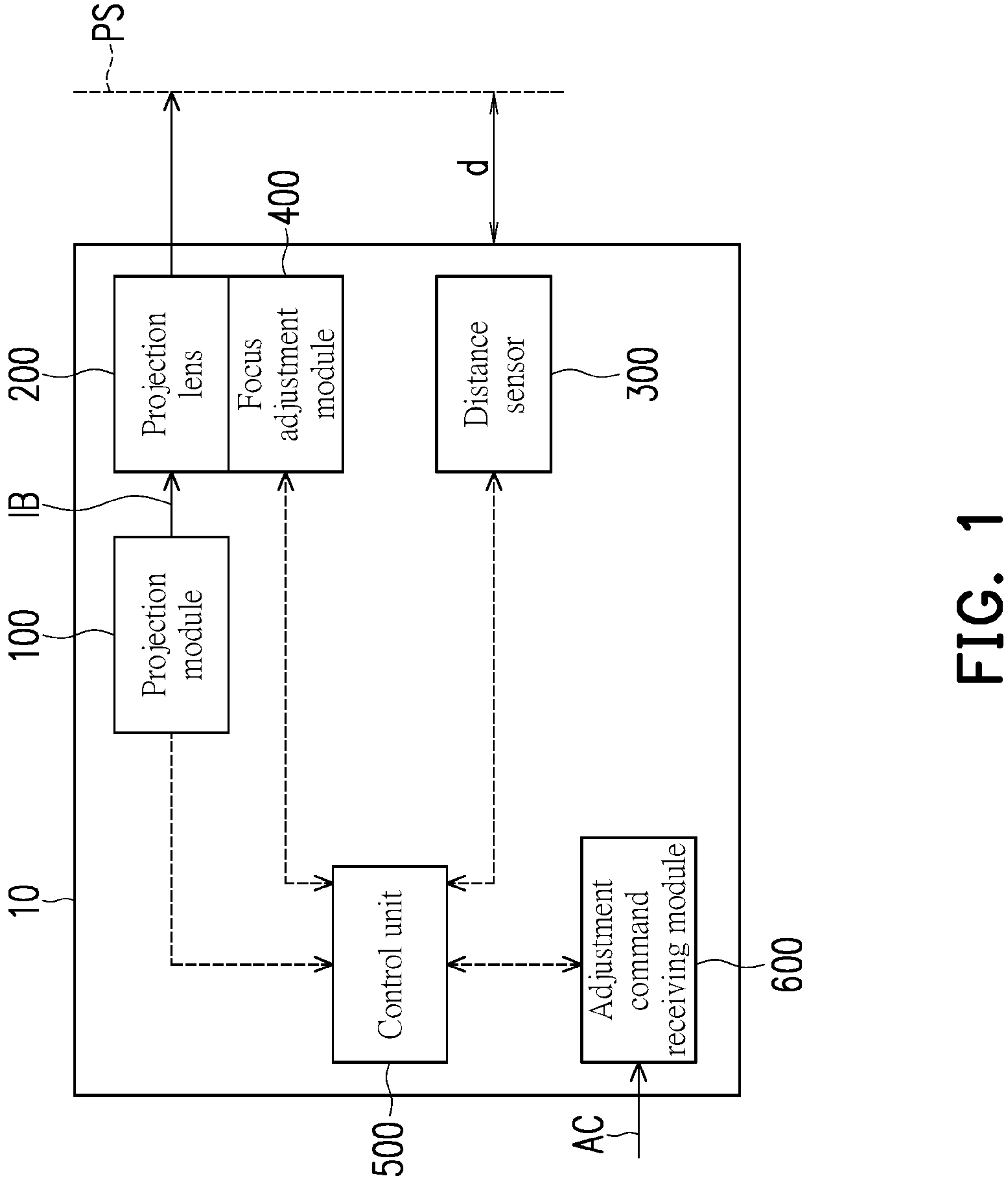
FIG. 1 is a schematic diagram of a projection device according to a first embodiment of the disclosure.

FIG. 1 is a schematic diagram of a projection device according to a first embodiment of the disclosure. Please refer to FIG. 1. An embodiment of the disclosure provides a projection device 10 for projecting an image beam IB to a projection surface PS. The projection device 10 includes a projection module 100, a projection lens 200, a distance sensor 300, a focus adjustment module 400, and a control unit 500.

In the embodiment, the projection module 100 is configured to generate the image beam IB. The projection module 100 may include, for example, a light source module (not shown) and a light valve (not shown). The light source module is configured to provide an illumination beam (not shown). The light source module may be formed by combining elements such as a light source, a wavelength conversion element, a light homogenizing element, a filter element, and a light guide element, and is configured to provide light beams with different wavelengths as the source of the illumination beam. The light source may be a light emitting diode (LED) or a laser diode (LD). The light valve is disposed on a transmission path of the illumination beam and is configured to convert the illumination beam into the image beam IB. The light valve is, for example, a reflective optical modulator, such as a liquid crystal on silicon (LCoS) panel or a digital micromirror device (DMD). In some embodiments, the light valve may also be a transmissive optical modulator, such as a transparent liquid crystal panel, an electro-optical modulator, a magneto-optical modulator, or an acousto-optical modulator (AOM).

In the embodiment, the projection lens 200 is disposed on a transmission path of the image beam IB from the projection module 100. The projection lens 200 includes, for example, a combination of one or more optical lens elements with diopters, such as various combinations of non-planar lens elements such as biconcave lens elements, biconvex lens elements, concave-convex lens elements, convex-concave lens elements, plano-convex lens elements, and plano-concave lens elements. In an embodiment, the projection lens 200 may further include a planar optical lens element to project the image beam IB from the light valve to the projection surface PS in a reflective manner.

In the embodiment, the distance sensor 300 may be a time of flight (ToF) sensor or other distance sensors.

In the embodiment, the focus adjustment module 400 is connected to the projection lens 200. The focus adjustment module 400 includes, for example, a driving device such as a stepping motor and an adjustment component such as a focus adjustment ring. The adjustment component is connected to the projection lens 200. The adjustment component is driven by controlling the driving device to drive the projection lens 200 to move, so as to adjust an imaging focal length of the projection lens 200.

In the embodiment, the control unit 500 includes, for example, a microcontroller unit (MCU), a central processing unit (CPU), a microprocessor, a digital signal processor (DSP), a programmable controller, a programmable logic device (PLD), other similar devices, or a combination of the devices, but the disclosure is not limited thereto. In addition, in an embodiment, each function of the control unit 500 may be implemented as multiple program codes. The program codes are stored in a memory, and the program codes are executed by the control unit 500. Alternatively, in an embodiment, each function of the control unit 500 may be implemented as one or more circuits. The disclosure does not limit the implementation of each function of the control unit 500 by means of software or hardware.

In the embodiment, the control unit 500 is electrically connected to the distance sensor 300 and the focus adjustment module 400. The control unit 500 is configured to enable the projection device 10 to enter a focus mode; enable the projection module 100 to project the image beam IB to the projection surface PS through the projection lens 200 to generate a projection image; enable the distance sensor 300 to sense a projection distance d between the projection device 10 and the projection surface PS; calculate a focus adjustment parameter by using an auto focus transfer function according to the projection distance d from the distance sensor 300; and control the focus adjustment module 400 to adjust a focal length of the projection lens 200 according to the focus adjustment parameter to perform auto focus.

In the embodiment, the auto focus transfer function is:

$$FP = d_{fp} + a\prod_{k=1}^{g(Dist)}\left(1 + L_{c1}L_{c2}^{k-1}\right)$$

where FP is the focus adjustment parameter, $d_{fp}$ is the focus deviation of the projection device 10, a is the minimum value of an object distance of the projection lens 200, g(Dist) is the projection distance transfer parameter, and $L_{c1}$ and $L_{c2}$ are the lens element parameters of the projection lens 200, wherein $L_{c1}$ and $L_{c2}$ are respectively related to the curvature of an incident surface and the curvature of an outgoing surface of the projection lens 200.

In the embodiment, the projection distance transfer parameter g(Dist) is:

$$g(Dist) = \left[\frac{Dist - Dist_{min}}{Dist_{interval}}\right]$$

where Dist is the projection distance d, that is, the distance sensed by the distance sensor 300 between the projection device 10 and the projection surface PS, $Dist_{min}$ is the minimum projection distance of the projection device 10 (that is, the minimum image distance of the projection lens), and $Dist_{interval}$ is the calculation precision parameter, wherein the calculation precision parameter $Dist_{interval}$ is the distance unit. When a smaller calculation precision parameter $Dist_{interval}$ is selected, the system may obtain a more precise focus adjustment parameter FP, but the burden on the system is greater. Conversely, when a greater calculation precision parameter $Dist_{interval}$ is selected, the burden on the system is smaller, but the precision of the focus adjustment parameter FP is lower. Therefore, the magnitude of the calculation precision parameter $Dist_{interval}$ may be determined by the computing power of the system. In addition, in the projection distance transfer parameter g(Dist), since a short-distance sensing error is greater than a long-distance sensing error, the minimum projection distance of the projection device 10 is selected as a reference point for calculating the distance, so that the corrected system has a smaller error. However, in order to ensure clear focus at the minimum projection distance, it is preferable to select the minimum projection distance $Dist_{min}$ in the projection distance transfer parameter g(Dist) as the reference point for calculating the distance.

In the embodiment, according to a projection distance range suitable for placement of the projection device 10, the projection device 10 is placed at the minimum projection distance $Dist_{min}$, and the control unit 500 sets the projection distance d sensed by the distance sensor 300 as the minimum projection distance $Dist_{min}$. The control unit 500 is configured to obtain the focus adjustment parameter FP after receiving a signal that the projection image is clear; calculate a focus deviation $d_{fp}$ of the projection device according to the focus adjustment parameter FP and the minimum projection distance $Dist_{min}$; and obtain the auto focus transfer function according to the focus deviation $d_{fp}$. The signal that the projection image is clear is, for example, generated by an adjustment command receiving module 600. The projection distance range suitable for placement is, for example, a specification corresponding to the projection lens configured by the projection device, which may be obtained from the user manual of the projection device or the supplier of the projection device, but the disclosure is not limited thereto.

In the embodiment, the projection device 10 further includes the adjustment command receiving module 600, which is electrically connected to the control unit 500 and is configured to receive a focus adjustment command AC from an on-screen display (OSD) or an external remote control device. The control unit 500 is configured to adjust the focal length of the projection lens 200 by the focus adjustment module 400 according to the focus adjustment command AC, so as to adjust the clarity of the projection image; and generate the signal that the projection image is clear. In more detail, when the user confirms that the projection image is the clearest with the eyes, the OSD or the external remote control device (not shown) provides the signal confirming that the projection image is clear to the adjustment command receiving module 600, the adjustment command receiving module 600 transmits the signal that the projection image is clear to the control unit 500, so that the control unit 500 obtains the current focus adjustment parameter according to data of the projection lens 200 adjusted by the focus adjustment module 400, calculates the current focus deviation of the projection device 10 according to the current focus adjustment parameter, and then establishes the auto focus transfer function according to the focus deviation.

In other words, the minimum projection distance $Dist_{min}$ should be determined by the specification of each lens element in the projection lens 200. However, due to the assembly tolerance of each element in the projection device 10 or the sensing error of the distance sensor 300, when the user places the projection device 10 at the minimum projection distance $Dist_{min}$, the projection distance d sensed by the distance sensor 300 at this time may not be equal to the value of the minimum projection distance $Dist_{min}$. Therefore, it is necessary to establish the initial focus deviation $d_{fp}$ first after considering the errors, so that the system may obtain the initial auto focus transfer function. After the initial auto focus transfer function is established, the control unit 500 may perform auto focus by the projection distance d and by using the auto focus transfer function.

Figure 9:
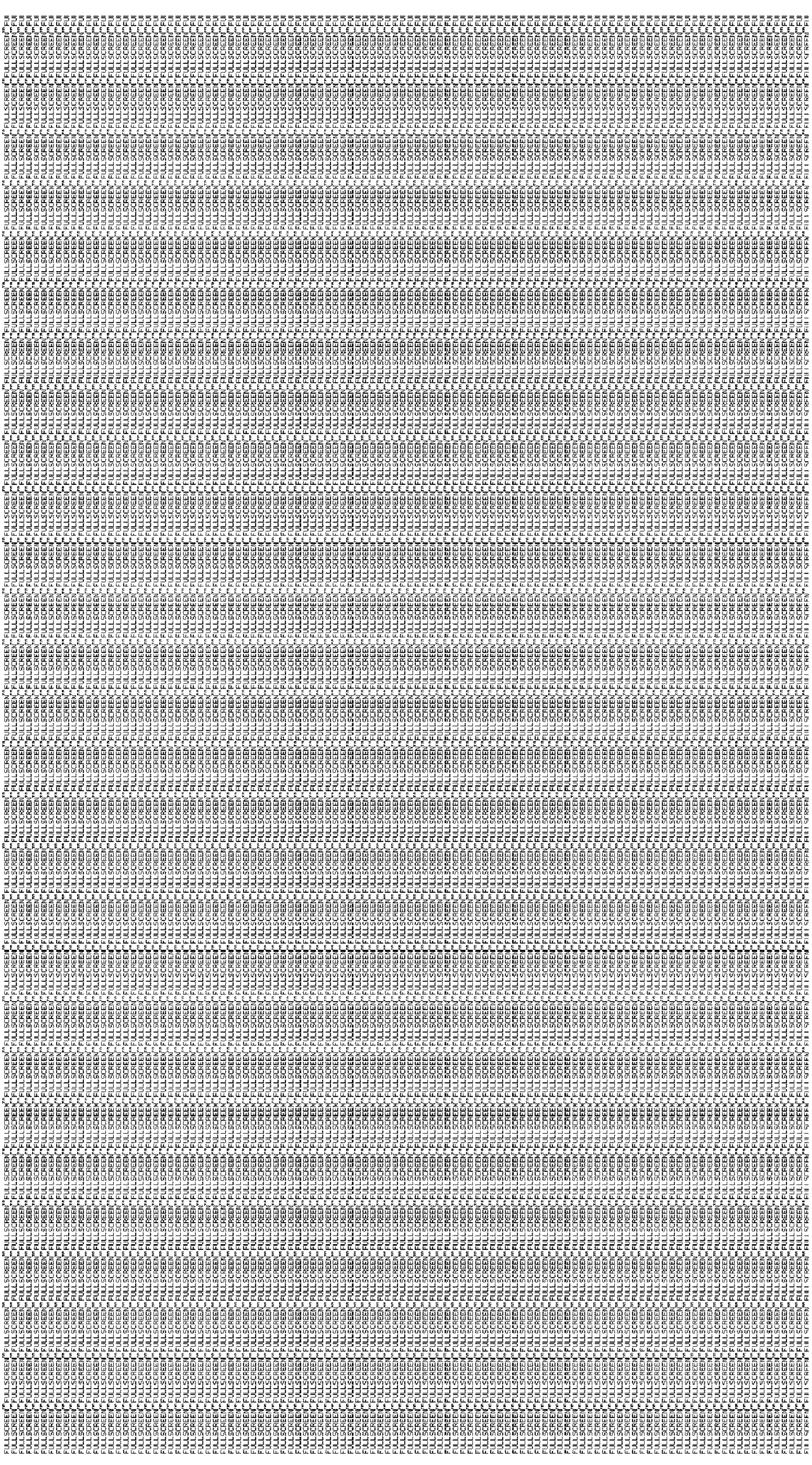
FIG. 9 is a schematic diagram of a calibration image in the method for establishing the calibrated auto focus transfer function according to FIG. 4.

In the embodiment, the control unit 500 is configured to enable the projection device 10 to project a calibration image as shown in FIG. 9 when the projection image after the auto focus of the projection device 10 is not clear; adjust the focal length of the projection lens 200 by the focus adjustment module 400 according to the focus adjustment command AC, so as to adjust the clarity of the calibration image; receive a signal that the calibration image is clear generated from the adjustment command receiving module 600; calculate a focus adjustment parameter FP' at this time according to an adjusted focal length of the projection lens 200; and calculate a calibrated focus deviation $d_{fp}'$ according to the focus adjustment parameter FP' at this time, so as to establish a calibrated auto focus transfer function.

In addition, in the embodiment, when the projection image after the auto focus of the projection device 10 is clear, the projection device 10 is enabled (by the control unit 500) to leave the focus mode.

In other words, when the projection image after the auto focus is not clear, the user may adjust the clarity of the calibration image by the adjustment command receiving module 600. After the calibration image is clear, the adjustment command receiving module 600 generates the signal that the calibration image is clear, so that the projection device 10 generates/establishes the calibrated focus deviation $d_{fp}'$, and then enables the projection device 10 to generate/establish the calibrated auto focus transfer function. The projection device 10 may, for example, generate an image (not completely covering the calibration image) of the on screen display (OSD), and the user adjusts the clarity of the calibration image by the adjustment command receiving module 600 and according to an instruction of the image of the OSD. However, the disclosure does not limit the operating manner of the adjustment command receiving module 600.

Figure 2:
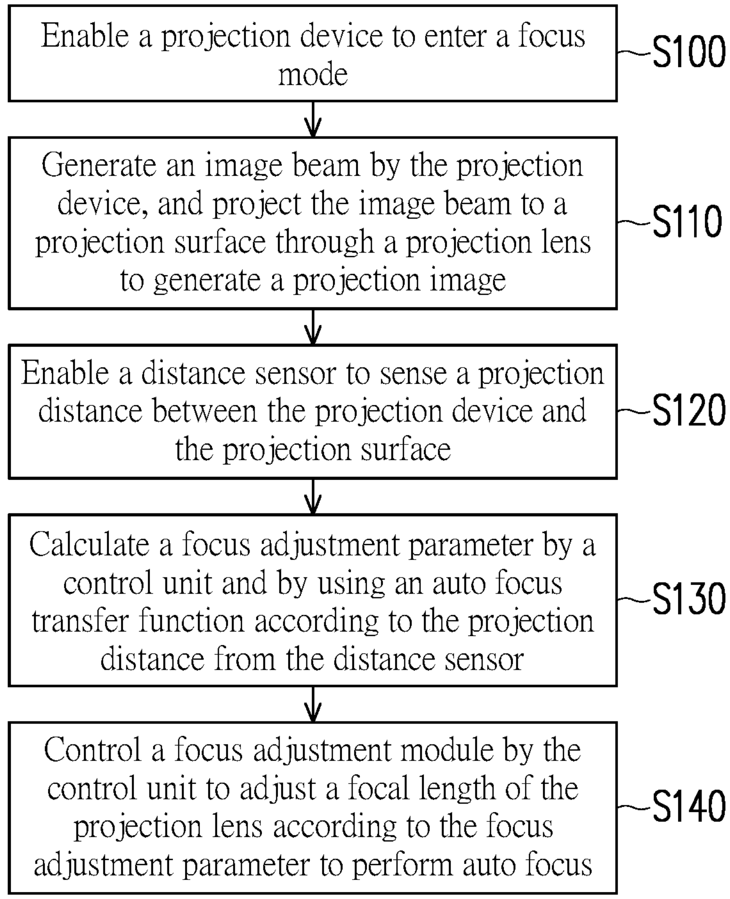
FIG. 2 is a flowchart of an auto focus method according to the first embodiment of the disclosure.

FIG. 2 is a flowchart of an auto focus method according to the first embodiment of the disclosure. Please refer to FIG. 2. An embodiment of the disclosure provides an auto focus method applicable to the projection device 10, which includes the following steps. In Step S100, the projection device 10 is enabled to enter the focus mode. In Step S110, the image beam IB is generated by the projection device 10, and the image beam IB is projected to the projection surface PS through the projection lens 200 to generate the projection image. In Step S120, the distance sensor 300 is enabled to sense the projection distance d between the projection device 10 and the projection surface PS. In Step S130, the focus adjustment parameter FP is calculated by the control unit 500 and by using the auto focus transfer function according to the projection distance d from the distance sensor 300. In Step S140, the focus adjustment module 400 is controlled by the control unit 500 to adjust the focal length of the projection lens 200 according to the focus adjustment parameter FP to perform auto focus.

Figure 3:
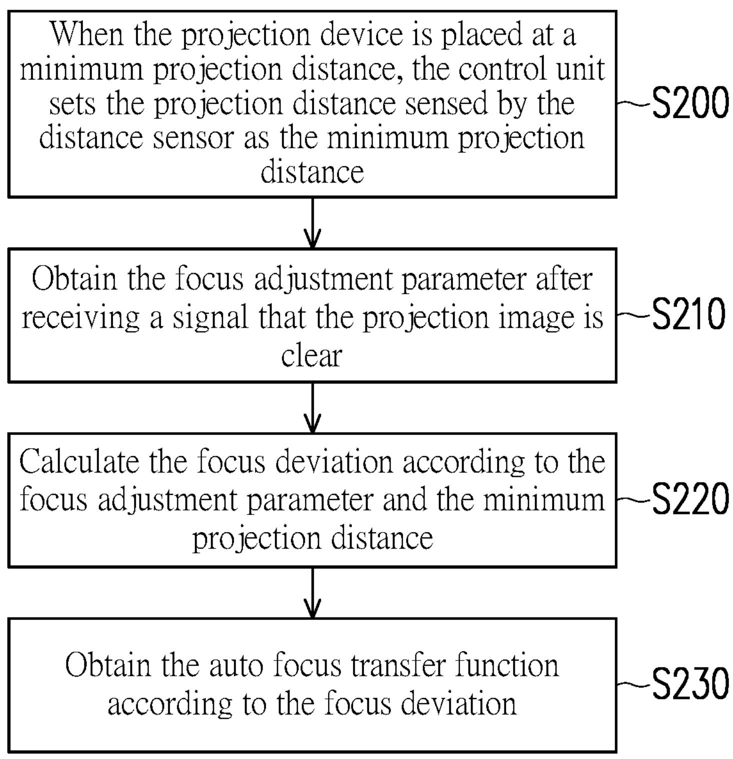
FIG. 3 is a flowchart of obtaining an auto focus transfer function in FIG. 2.

FIG. 3 is a flowchart of obtaining an auto focus transfer function in FIG. 2. Please refer to FIG. 3. In the embodiment, the auto focus method for obtaining the auto focus transfer function includes the following steps. In Step S200, when the projection device 10 is placed at the minimum projection distance $Dist_{min}$, the control unit 500 sets the projection distance d sensed by the distance sensor 300 as the minimum projection distance $Dist_{min}$. In Step S210, after receiving the signal that the projection image is clear, the focus adjustment parameter FP is obtained. In Step S220, the focus deviation $d_{fp}$ is calculated according to the focus adjustment parameter FP and the minimum projection distance $Dist_{min}$. In Step S230, the auto focus transfer function is obtained according to the focus deviation $d_{fp}$.

Figure 4:
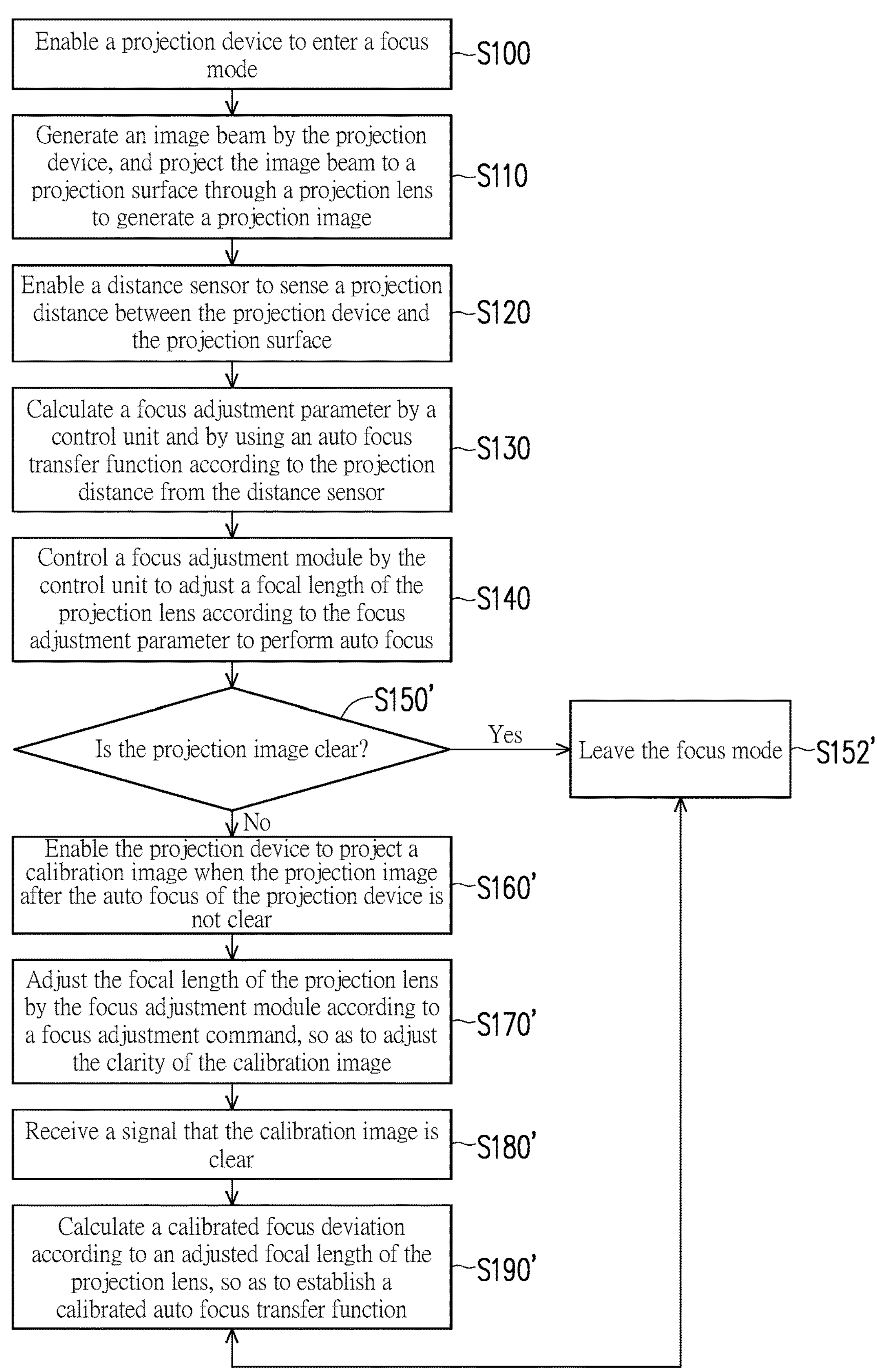
FIG. 4 is a flowchart of establishing a calibrated auto focus transfer function according to the auto focus method of FIG. 2.

FIG. 4 is a flowchart of establishing a calibrated auto focus transfer function according to the auto focus method of FIG. 2. Please refer to FIG. 4. In the embodiment, the auto focus method further includes the following steps. In Step S150', whether the projection image is clear is confirmed, that is, after completing the auto focus method of Step S100 to Step S140, the user may confirm the clarity of the projection image. In Step S152', when the projection image after the auto focus of the projection device 10 is clear, the projection device 10 is enabled to leave the focus mode. In Step S160', when the projection image after the auto focus of the projection device 10 is not clear, the projection device 10 is enabled to project the calibration image. In Step S170', the focal length of the projection lens 200 is adjusted by the focus adjustment module 400 according to the focus adjustment command AC, so as to adjust the clarity of the calibration image. In Step S180', the signal that the calibration image is clear is received. In Step S190', the calibrated focus deviation $d_{fp}'$ is calculated according to the adjusted focal length of the projection lens 200, so as to establish the calibrated auto focus transfer function. In the embodiment, the calibration image projected by the projection device 10 in Step S160' has a pattern (text) as shown in FIG. 9 for the user to judge the clarity of the image. However, the calibration image of the disclosure is not limited to the pattern presented in the image, as long as there is a pattern in the calibration image that can be seen by the human eyes of the user as blurred or clear.

Figure 5:
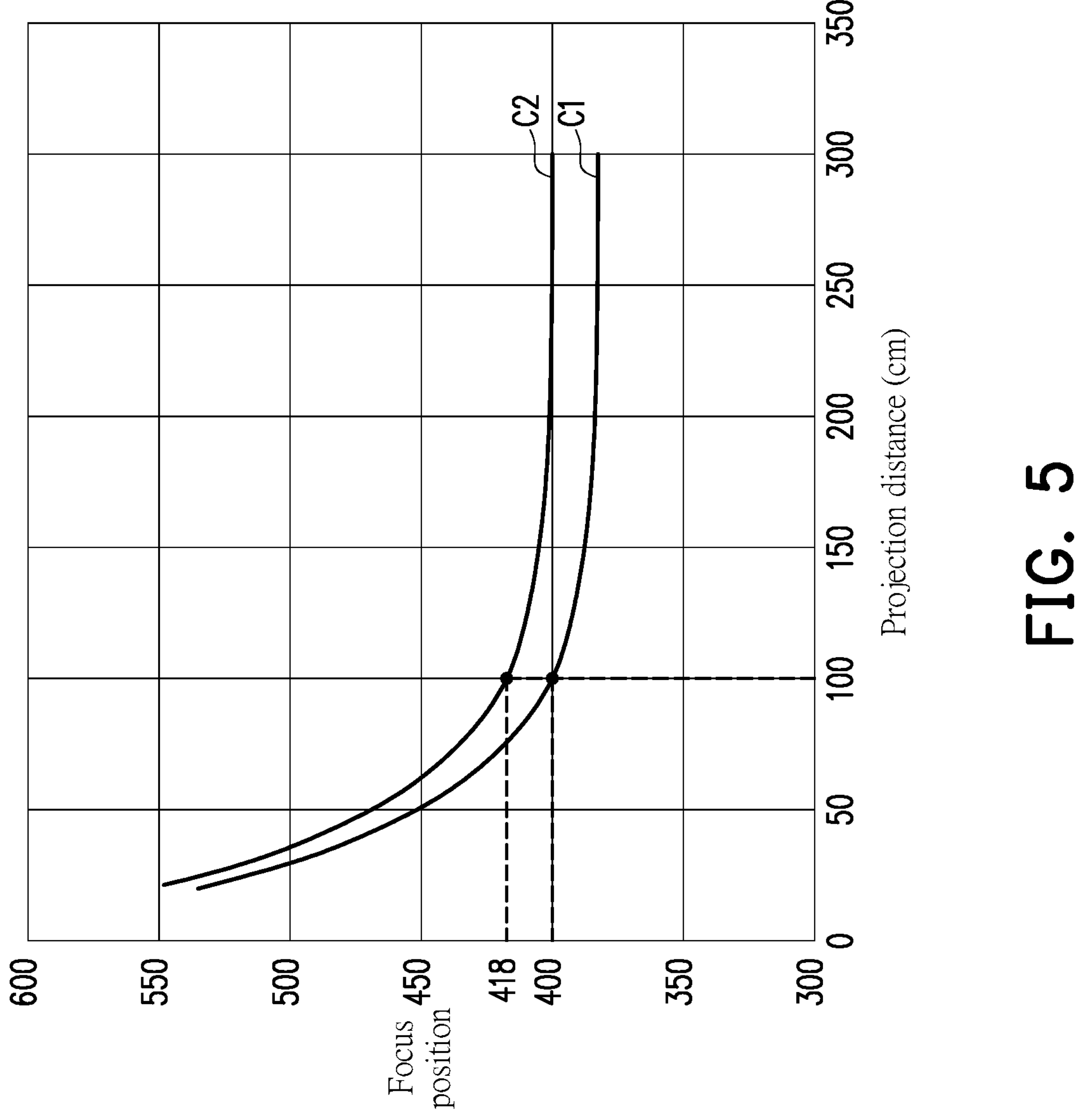
FIG. 5 is a graph of the auto focus transfer function and the calibrated auto focus transfer function.

FIG. 5 is a graph of the auto focus transfer function and the calibrated auto focus transfer function. In FIG. 5, the unit of the horizontal axis is centimeter (cm). A curve C1 may be the initial/default auto focus transfer function. A curve C2 may be the calibrated auto focus transfer function. When the projection distance d is 100 cm, the focus adjustment parameter FP corresponding to the initial/default auto focus transfer function is 400, and the focus adjustment parameter FP' corresponding to the calibrated auto focus transfer function is 418.

Based on the above, in the projection device 10 and the auto focus method of the embodiments of the disclosure, since the system can calculate the focus adjustment parameter FP by using the auto focus transfer function according to the projection distance d, and then adjust the focal length of the projection lens 200 according to the focus adjustment parameter FP to perform auto focus, using the projection device 10 and the auto focus method of the embodiments of the disclosure can maintain a preferable projection effect. Furthermore, the projection device often encounters poor auto focus effect over time, requiring the user to manually focus every time during use. However, in the embodiment, when the auto focus effect of the system is poor, the user may control the focus adjustment module 400 to adjust the focal length of the projection lens 200 by using the OSD or the external remote control device (not shown). At this time, the system correspondingly corrects the errors, and establishes the calibrated auto focus transfer function. Therefore, using the projection device 10 and the auto focus method of the embodiments of the disclosure can provide the user with an improved experience.

In addition, the traditional projection device or auto focus method establishes the same focus adjustment parameter for each projection device, but the difference before the machine leaves the factory affects the auto focus effect. However, in the projection device 10 and the auto focus method of the embodiments of the disclosure, when the projection device 10 is used for the first time, the projection device 10 may be placed at the minimum projection distance first before the focus of the projection device 10 is adjusted, so that the system obtains the auto focus transfer function. Therefore, the projection device 10 and the auto focus method of the embodiments of the disclosure can generate an improved auto focus effect.

Figure 6:
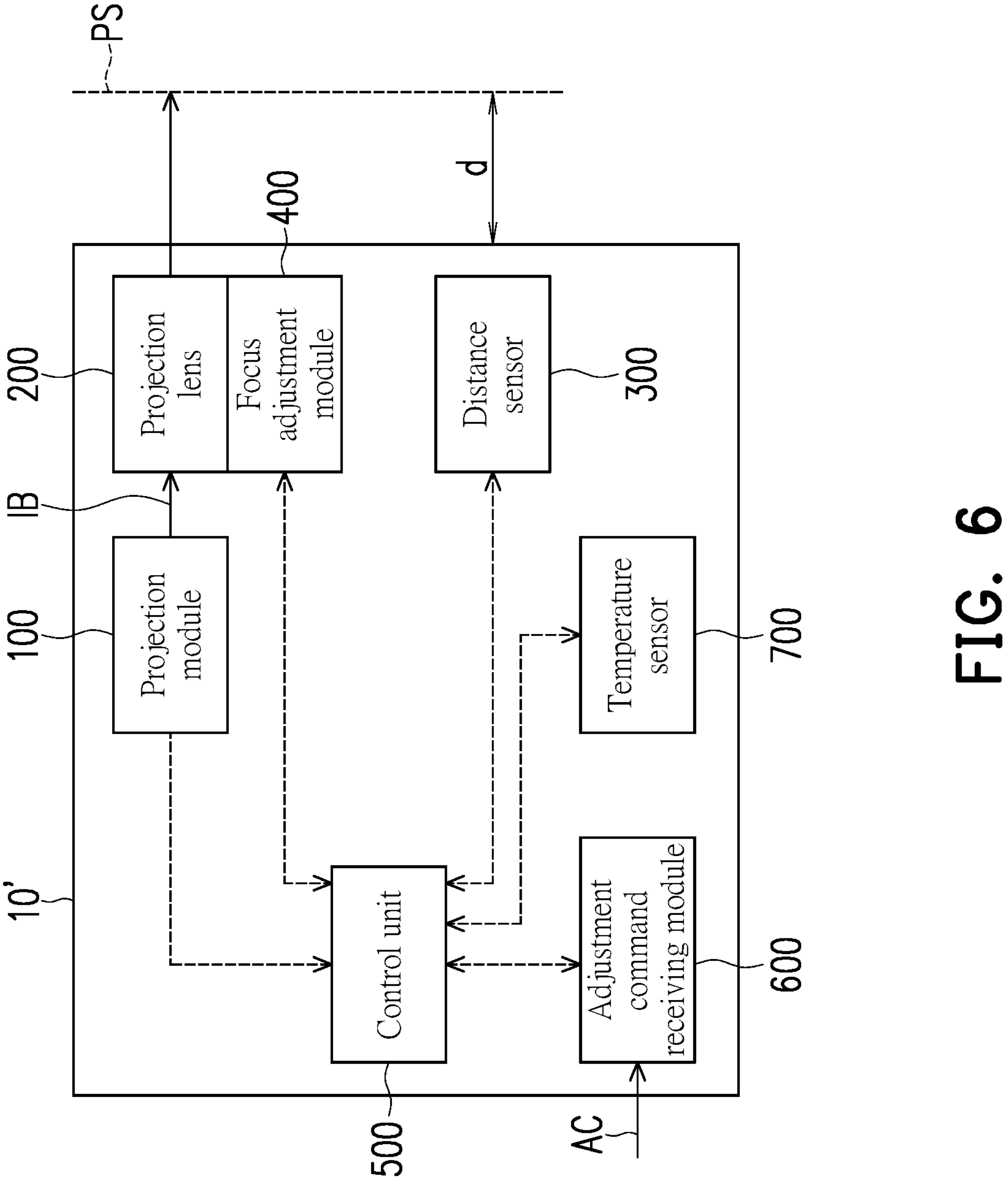
FIG. 6 is a schematic diagram of a projection device according to a second embodiment of the disclosure.

FIG. 6 is a schematic diagram of a projection device according to a second embodiment of the disclosure. Please refer to FIG. 6. The main difference between a projection device 10' and the projection device 10 of FIG. 1 is that the projection device 10' also includes a temperature sensor 700. In the embodiment, the temperature sensor 700 is electrically connected to the control unit 500. The control unit 500 is configured to enable the temperature sensor 700 to sense a temperature inside the projection device 10'; judge that the temperature falls within one of multiple temperature intervals; and calculate the focus adjustment parameter FP at this time by using the auto focus transfer function according to lens element parameters $L_{c1}(T)$ and $L_{c2}(T)$ corresponding to the one of the temperature intervals, a focus deviation $d_{fp}(T)$ corresponding to the temperature, and the projection distance d sensed by the distance sensor 300, and adjust the focal length of the projection lens 10' according to the focus adjustment parameter FP. The lens element parameters corresponding to different temperature intervals and the focus deviations corresponding to the temperatures may be prestored in a storage unit (not shown) of the projection device 10'. In other embodiments, the temperature sensor 700 may be configured to sense a temperature outside the projection device, such as the ambient temperature around the projection device.

Figure 7:
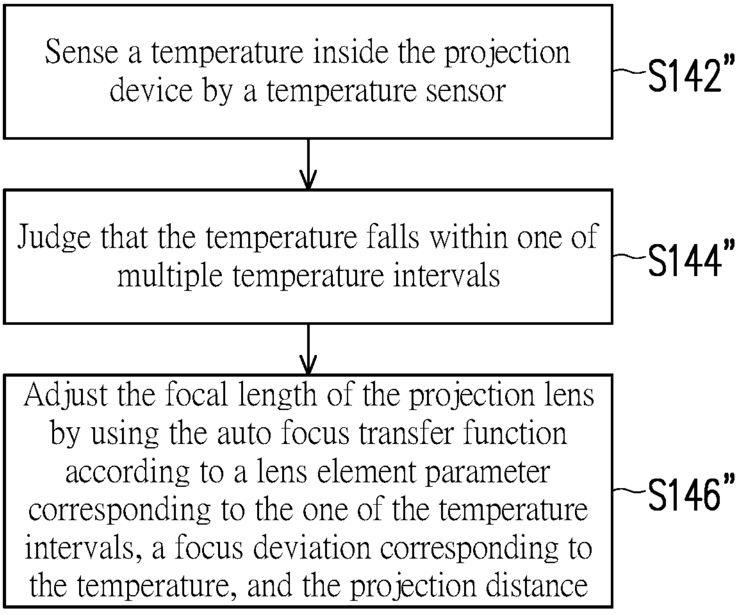
FIG. 7 is a flowchart of performing auto focus according to a focus adjustment parameter in the auto focus method of the second embodiment of the disclosure.

FIG. 7 is a flowchart of performing auto focus according to a focus adjustment parameter in the auto focus method of the second embodiment of the disclosure. Please refer to FIG. 7. In the embodiment, the auto focus method further includes the following steps. In Step S142", the temperature inside the projection device 10' is sensed by the temperature sensor 700. In Step S144", it is judged that the temperature falls within one of the temperature intervals. In Step S146", the focal length of the projection lens 200 is adjusted by using the auto focus transfer function according to the lens element parameters $L_{c1}(T)$ and $L_{c2}(T)$ corresponding to the one of the temperature intervals, the focus deviation $d_{fp}(T)$ corresponding to the temperature, and the projection distance d.

Figure 8:
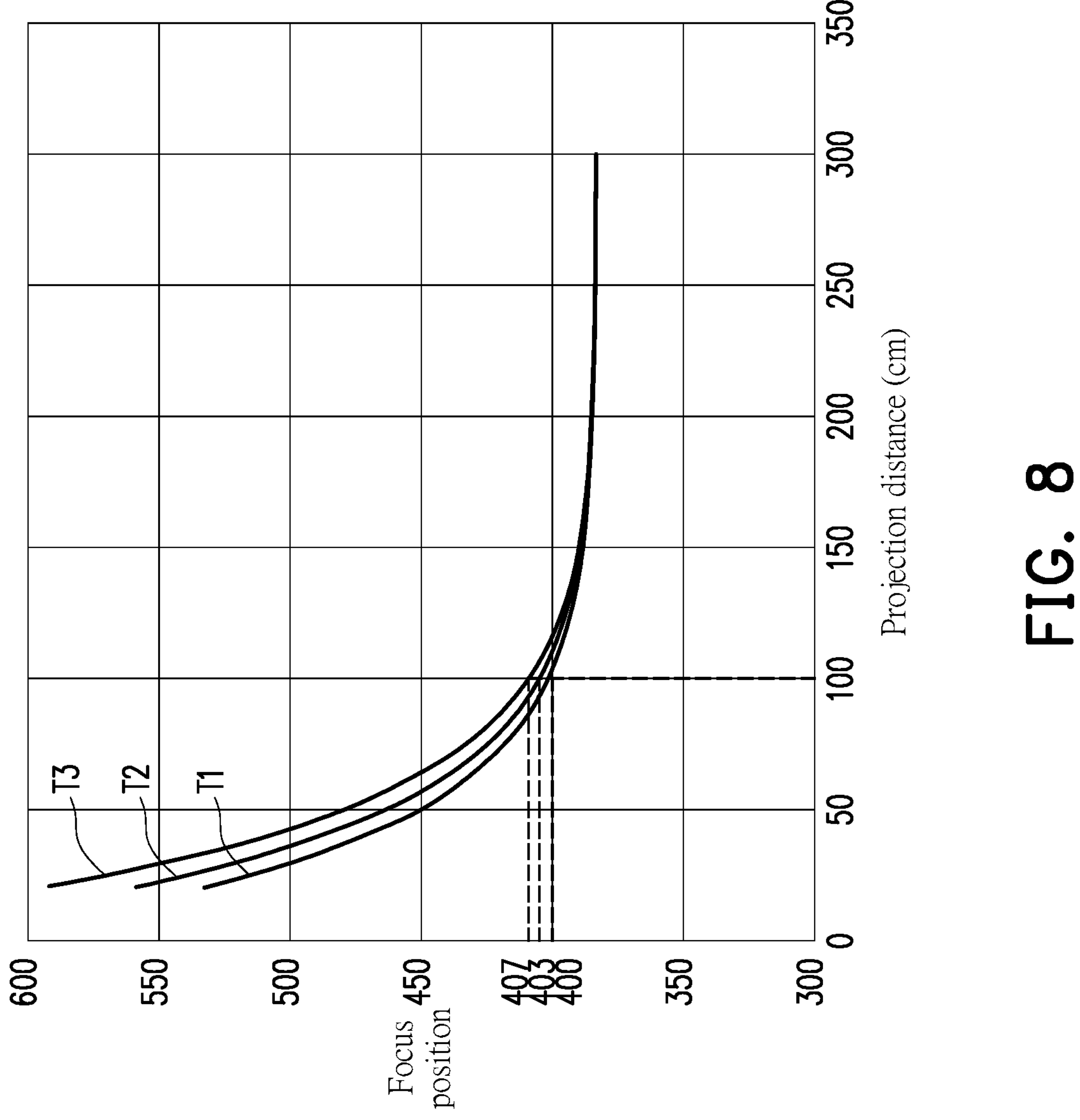
FIG. 8 is a graph of the auto focus transfer function in different temperature intervals in the projection device or the auto focus method of the second embodiment of the disclosure.

FIG. 8 is a graph of the auto focus transfer function in different temperature intervals in the projection device or the auto focus method of the second embodiment of the disclosure. The unit of the horizontal axis is centimeter (cm), and the temperature interval refers to one of the temperature intervals corresponding to the temperature of the projection device 10' sensed by the temperature sensor 700 (shown in FIG. 7). In FIG. 8, a curve T1, for example, corresponds to the auto focus transfer function whose temperature interval is less than 35 degrees, a curve T2, for example, corresponds to the auto focus transfer function whose temperature interval falls within the range of 35 to 45 degrees, and a curve T3, for example, corresponds to the auto focus transfer function whose temperature interval falls within the range of 45 to 55 degrees. When the projection distance d is 100 cm, a focus adjustment parameter FP(T1) corresponding to the auto focus transfer function whose temperature interval is less than 35 degrees is 400, a focus adjustment parameter FP(T2) corresponding to the auto focus transfer function whose temperature interval falls within the range of 35 to 45 degrees is 403, and a focus adjustment parameter FP(T3) corresponding to the auto focus transfer function whose temperature interval falls within the range of 45 to 55 degrees is 407.

Based on the above, in the projection device 10' and the auto focus method of the embodiments of the disclosure, since the system senses the temperature inside the projection device 10' by the temperature sensor 700, calculates the focus adjustment parameter at this time by using the auto focus transfer function according to the lens element parameters and the focus deviation corresponding to the temperature and the currently sensed projection distance, and adjusts the focal length of the projection lens 200 according to the focus adjustment parameter, the projection device 10' and the auto focus method can solve the issue that the auto focus is not clear caused by changes in the structure of the projection lens due to changes in temperature.

In summary, in the projection device and the auto focus method of the embodiments of the disclosure, since the system can calculate the focus adjustment parameter by using the auto focus transfer function according to the projection distance, and then adjust the focal length of the projection lens according to the focus adjustment parameter to perform auto focus, using the projection device and the auto focus method of the embodiments of the disclosure can maintain a preferable projection effect. Furthermore, when the auto focus effect of the system is poor, the user may adjust the focal length of the projection lens by using the focus adjustment module. At this time, the system establishes the calibrated auto focus transfer function corresponding to the adjustment. Therefore, using the projection device and the auto focus method of the embodiments of the disclosure can provide the user with an improved experience.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the disclosure" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be configured to interpret or limit the scope or meaning of the claims. Any advantages and benefits described may not apply to all embodiments of the invention. It should be appreciated that variations may be made in the embodiments described by persons skilled in the art without departing from the scope of the disclosure as defined by the following claims. Moreover, no element and component in the disclosure is intended to be dedicated to the public regardless of whether the element or component is explicitly recited in the following claims.

What is claimed is:

1. A projection device, configured to project an image beam to a projection surface, the projection device comprising: a projection module, a projection lens, a distance sensor, a focus adjustment module, and a control unit, wherein the projection module is configured to generate the image beam;

the projection lens is disposed on a transmission path of the image beam from the projection module;

the focus adjustment module is connected to the projection lens, and the control unit is electrically connected to the distance sensor and the focus adjustment module, wherein the control unit is configured to:

enable the projection device to enter a focus mode;

enable the projection module to project the image beam to the projection surface through the projection lens to generate a projection image;

enable the distance sensor to sense a projection distance between the projection device and the projection surface;

calculate a focus adjustment parameter by using an auto focus transfer function according to the projection distance from the distance sensor; and control the focus adjustment module to adjust a focal length of the projection lens according to the focus adjustment parameter to perform auto focus.

2. The projection device according to claim 1, wherein the auto focus transfer function is:

$$FP = d_{fp} + a\prod_{k=1}^{g(Dist)}\left(1 + L_{c1}L_{c2}^{k-1}\right)$$

where FP is the focus adjustment parameter, $d_{fp}$ is a focus deviation of the projection device, a is a minimum value of an object distance of the projection lens, g(Dist) is a projection distance transfer parameter, and $L_{c1}$ and $L_{c2}$ are lens element parameters of the projection lens.

3. The projection device according to claim 2, wherein the projection distance transfer parameter is:

$$g(Dist) = \left[\frac{Dist - Dist_{min}}{Dist_{interval}}\right]$$

where Dist is the projection distance, $Dist_{min}$ is a minimum projection distance of the projection device, and $Dist_{interval}$ is a calculation precision parameter.

4. The projection device according to claim 2, wherein when the projection device is placed at a minimum projection distance, the control unit sets the projection distance sensed by the distance sensor as the minimum projection distance, wherein the control unit is configured to:

obtain the focus adjustment parameter after receiving a signal that the projection image is clear;

calculate the focus deviation according to the focus adjustment parameter and the minimum projection distance; and obtain the auto focus transfer function according to the focus deviation.

5. The projection device according to claim 4, further comprising:

an adjustment command receiving module, electrically connected to the control unit and configured to receive a focus adjustment command from a user or an external remote control device, wherein the control unit is configured to:

adjust the focal length of the projection lens by the focus adjustment module according to the focus adjustment command, so as to adjust clarity of the projection image; and generate the signal that the projection image is clear.

6. The projection device according to claim 2, further comprising:

an adjustment command receiving module, electrically connected to the control unit and configured to receive a focus adjustment command from a user or an external remote control device, wherein the control unit is configured to:

enable the projection device to project a calibration image when the projection image after auto focus of the projection device is not clear;

adjust the focal length of the projection lens by the focus adjustment module according to the focus adjustment command, so as to adjust clarity of the calibration image;

receive a signal that the calibration image is clear generated from the adjustment command receiving module;

calculate a focus adjustment parameter at this time according to an adjusted focal length of the projection lens; and calculate a calibrated focus deviation according to the focus adjustment parameter at this time, so as to establish a calibrated auto focus transfer function.

7. The projection device according to claim 6, wherein the projection device is enabled to leave the focus mode when the projection image after the auto focus of the projection device is clear.

8. The projection device according to claim 2, further comprising:

a temperature sensor, electrically connected to the control unit, wherein the control unit configured to:

enable the temperature sensor to sense a temperature inside the projection device;

judge that the temperature falls within one of a plurality of temperature intervals; and adjust the focal length of the projection lens by using the auto focus transfer function according to a lens element parameter corresponding to the one of the temperature intervals, a focus deviation corresponding to the temperature, and the projection distance.

9. An auto focus method, applicable to a projection device, wherein the projection device comprises a distance sensor, a focus adjustment module, and a control unit, the control unit is electrically connected to the distance sensor and the focus adjustment module, the auto focus method comprising:

enabling the projection device to enter a focus mode;

generating an image beam by the projection device, and projecting the image beam to a projection surface through a projection lens to generate a projection image;

enabling the distance sensor to sense a projection distance between the projection device and the projection surface;

calculating a focus adjustment parameter by the control unit and by using an auto focus transfer function according to the projection distance from the distance sensor; and controlling the focus adjustment module by the control unit to adjust a focal length of the projection lens according to the focus adjustment parameter to perform auto focus.

10. The auto focus method according to claim 9, wherein the auto focus transfer function is:

$$FP = d_{fp} + a \prod_{k=1}^{g(Dist)} \left(1 + L_{c1} L_{c2}^{k-1}\right)$$

where FP is the focus adjustment parameter, $d_{fp}$ is a focus deviation of the projection device, a is a minimum value of an object distance of the projection lens, g(Dist) is a projection distance transfer parameter, and $L_{c1}$ and $L_{c2}$ are lens element parameters of the projection lens.

11. The auto focus method according to claim 10, wherein the projection distance transfer $$g(Dist) = \frac{Dist - Dist_{min}}{Dist_{interval}}$$

where Dist is the projection distance, $Dist_{min}$ is a minimum projection distance of the projection device, and $Dist_{interval}$ is a calculation precision parameter.

12. The auto focus method according to claim 10, further comprising:

setting the projection distance sensed by the distance sensor as the minimum projection distance by the control unit when the projection device is placed at a minimum projection distance;

obtaining the focus adjustment parameter after receiving a signal that the projection image is clear;

calculating the focus deviation according to the focus adjustment parameter and the minimum projection distance; and obtaining the auto focus transfer function according to the focus deviation.

13. The auto focus method according to claim 10, further comprising:

enabling the projection device to project a calibration image when the projection image after auto focus of the projection device is not clear;

adjusting the focal length of the projection lens by the focus adjustment module according to a focus adjustment command, so as to adjust clarity of the calibration image;

receiving a signal that the calibration image is clear; and calculating a calibrated focus deviation according to an adjusted focal length of the projection lens, so as to establish a calibrated auto focus transfer function.

14. The auto focus method according to claim 13, further comprising: enabling the projection device to leave the focus mode when the projection image after the auto focus of the projection device is clear.

15. The auto focus method according to claim 10, comprising:

sensing a temperature inside the projection device by the temperature sensor;

judging that the temperature falls within one of a plurality of temperature intervals; and adjusting the focal length of the projection lens by using the auto focus transfer function according to a lens element parameter corresponding to the one of the temperature intervals, a focus deviation corresponding to the temperature, and the projection distance.

* * * * *